United States Patent [19]

Yates et al.

[11] Patent Number: 4,565,683

[45] Date of Patent: Jan. 21, 1986

[54] PRODUCTION OF CARBON FILAMENTS

[75] Inventors: David J. C. Yates, W. Millington; Rees T. Baker, Annandale, both of N.J.

[73] Assignee: Exxon Research and Engineering Co., Florham Park, N.J.

[21] Appl. No.: 628,520

[22] Filed: Jul. 6, 1984

Related U.S. Application Data

[63] Continuation-in-part of Ser. No. 440,451, Nov. 10, 1982, abandoned, which is a continuation-in-part of Ser. No. 222,613, Jan. 5, 1981, abandoned.

[51] Int. Cl.$^4$ .................. C01B 31/02; D01F 9/12
[52] U.S. Cl. .................. 423/447.3; 423/453; 423/458; 423/459
[58] Field of Search ............ 423/447.3, 448, 458, 423/447.1, 447.2, 445, 449, 453, 459, 632

[56] References Cited

FOREIGN PATENT DOCUMENTS 1469930 4/1977 United Kingdom .

OTHER PUBLICATIONS

Taylor "J. Iron and Steel Institute", vol. 184, 1956, pp. 1–6.
Baird et al., "Carbon" 1974, vol. 12, pp. 591–602.
Baker et al., "Chemistry and Physics of Carbon" vol. 14, 1978, pp. 83–165.

Primary Examiner—Edward J. Meros
Attorney, Agent, or Firm—Henry E. Naylor

[57] ABSTRACT

Disclosed is a method for producing carbon filaments by dissociating a carbon-containing gas at a temperature to about 800° C. in the presence of iron monoxide. The iron monoxide can be produced by treating a sample of substantially pure iron with steam at a temperature from about 540° C.

4 Claims, 2 Drawing Figures

PRODUCTION OF CARBON FILAMENTS

CROSS-REFERENCE TO RELATED APPLICATIONS

This application is a continuation-in-part application of U.S. Ser. No. 440,451, filed Nov. 10, 1982, now abandoned, which is a continuation-in-part application of U.S. Ser. No. 222,613, filed Jan. 5, 1981, now abandoned.

BACKGROUND OF THE INVENTION

The present invention relates to the production of carbon filaments from gaseous hydrocarbons using iron monoxide (FeO) as a catalyst.

There is a growing interest in the use of carbon filaments as fillers and reinforcing agents in polymeric compositions. Various methods have been developed for producing such filaments. For example, U.K. Pat. No. 1,469,930 teaches that carbon filaments of less than 10 microns length can be grown by the decomposition of acetylene on a catalyst in the form of metal particles carried by an inert substrate. The particles are deposited on the inert substrate, preferably in the form of a thin film. The substrate is taught to be preferably stainless steel in the form of a gauze, although such materials as graphite may be used.

Although such a method for producing carbon filaments has its merits, there is still need in the art for producing these filaments more abundantly and efficiently.

SUMMARY OF THE INVENTION

In accordance with the present invention there is provided a method for producing carbon filaments, which method comprises dissociating a carbon-containing gas in the presence of iron monoxide at a temperature from about the dissociation temperature of the carbon-containing gas to about 800° C., wherein the carbon-containing gas is selected from those that will dissociate at a temperature equal to or less than about 800° C., to produce carbon.

In one preferred embodiment of the present invention, a metallic iron composition, comprised of at least about 95 wt. % iron, is heated to a temperature of at least about 540° C. and contacted with steam for an effective amount of time, thereby producing iron monoxide. The iron monoxide is then contacted with one or more carbon-containing gases at a temperature from the dissociation temperature of the gas to about 800° C.

The iron-containing metal composition which can be used herein for the production of iron monoxide must be initially in a well-defined geometrical configuration. Non-limiting examples of such configurations containing metal can include tube, sheet, rod, foil, gauze, and particles having a relatively narrow particle size

DETAILED DESCRIPTION OF THE INVENTION

Iron-containing compositions used for the production of iron-monoxide in the present invention contain at least 95 wt. % iron, more preferably at least 98 wt. % iron, and most preferably substantially pure iron. These compositions should be substantially free of (a) protective oxide forming elements such as silicon, chromium, molybdenum, tantalum, and tungsten, and (b) metal components which are volatile at reaction temperatures herein such as cadmium, zinc and lead.

A well-defined geometrical configuration is of iron-containing composition needed because it has been unexpectedly discovered by the inventors herein that all of the iron material is first converted to FeO, after which the FeO is converted to $Fe_3O_4$ beginning on the outside surface. If treatment is continued for a sufficient length, the FeO will become totally converted to $Fe_3O_4$. Consequently, conventionally fabricated iron powders, which have a relatively wide range of particle sizes, do not lend themselves to making pure FeO, but rather a mixture of FeO and Fe or $Fe_3O_4$ and FeO would be produced.

Figure 1:
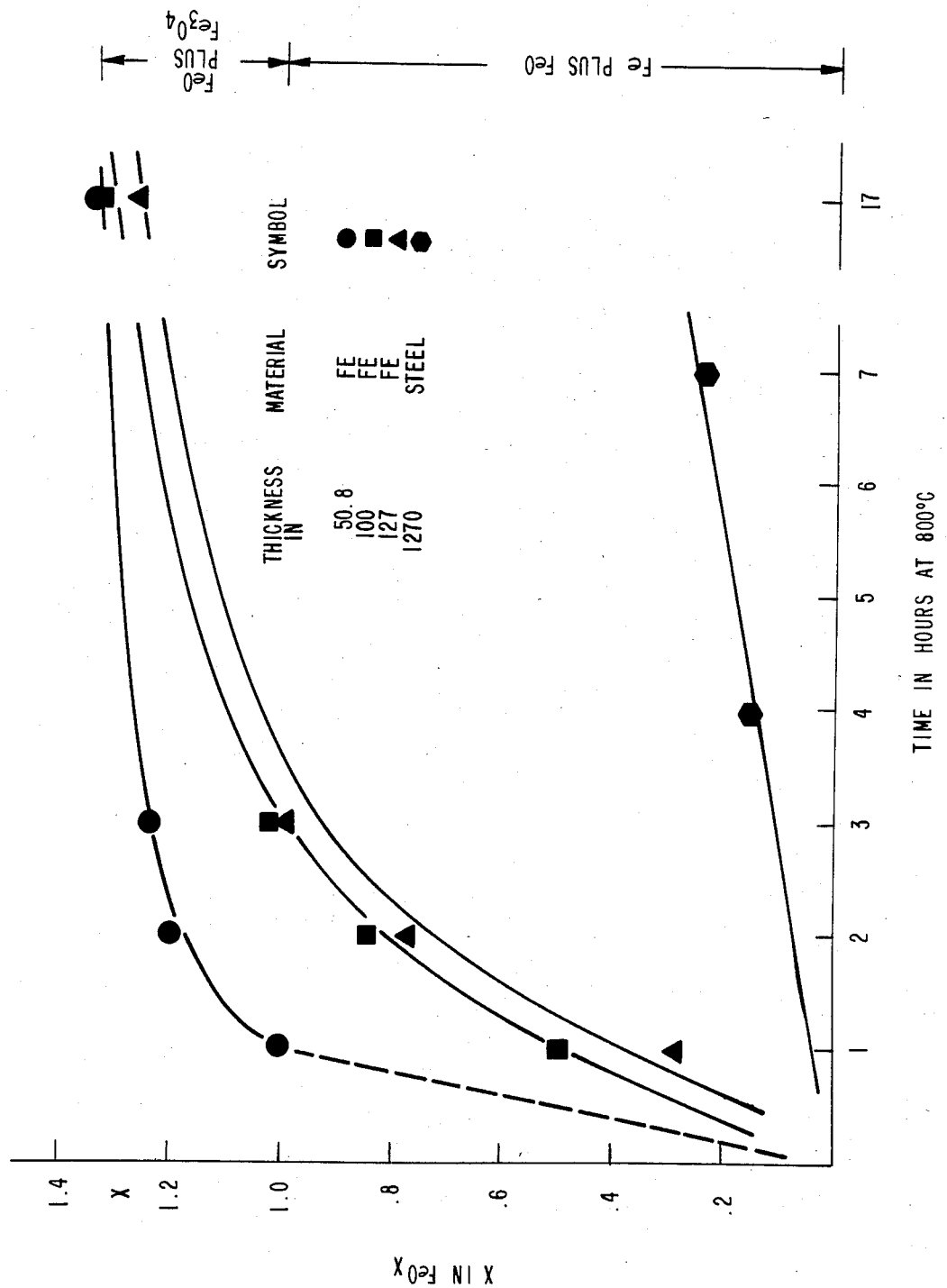
FIG. 1 is a plot of the rate of formation of $FeO_x$ as a function of Sample Thickness at 800° C.
Figure 2:
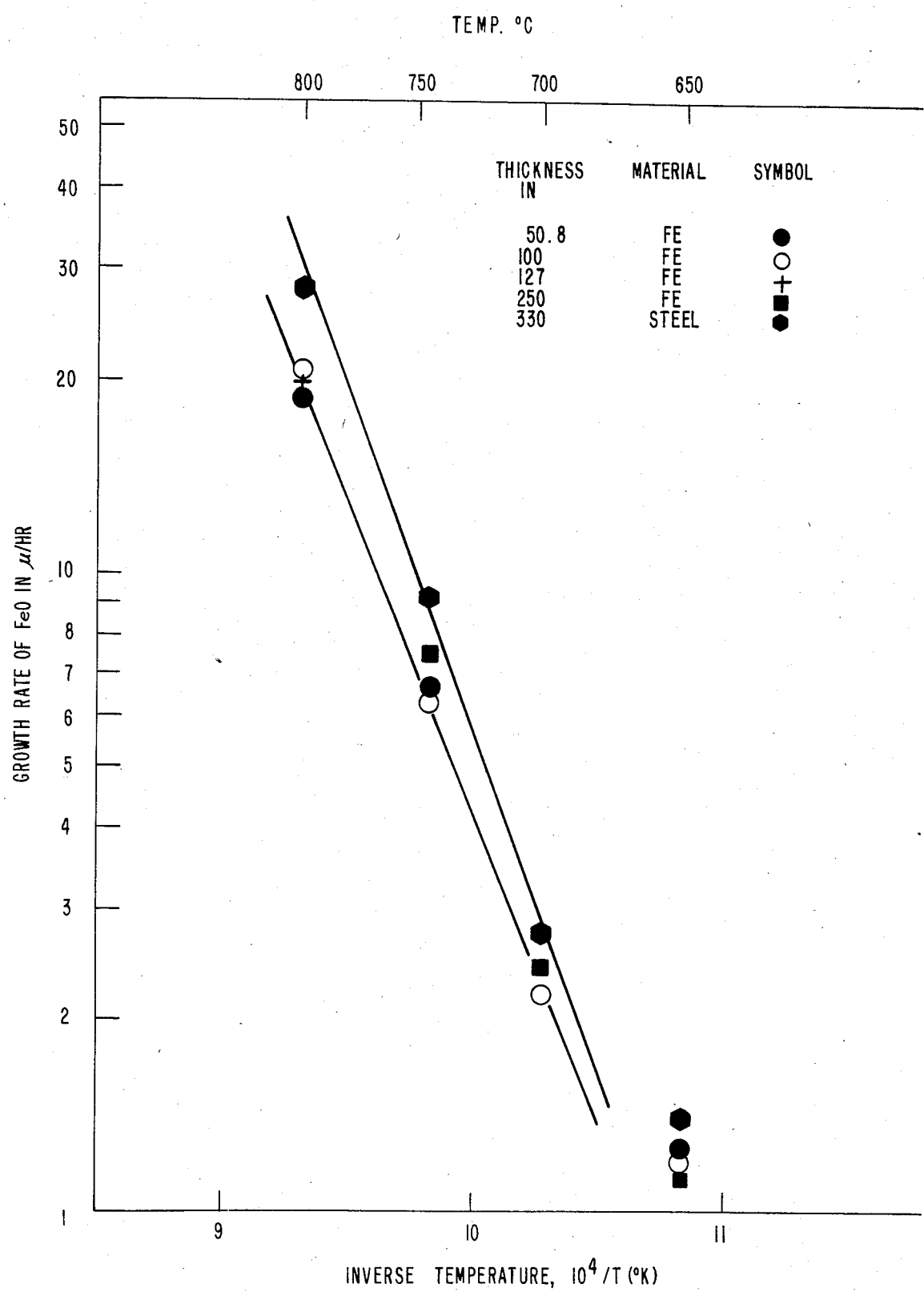
FIG. 2 is a plot of the growth rate ($\mu$/hr) of $FeO_x$ as a function of temperature of treatment.

In the practice of the present invention, iron monoxide is first produced by treating the iron-containing composition with steam at a temperature from at least about 540° C. for an effective amount of time. By an effective amount of time we mean that period of time required to convert the iron to form a predetermined thickness of FeO. For example, the inventors herein have found that pure iron foil having a thickness of about 115 microns can be converted entirely to FeO in about three hours at 800° C. (see FIG. 1). In this case, the effective amount of time for converting the entire sample to FeO could be no greater than about three hours; otherwise, the FeO at the outer surfaces will begin to be converted to $Fe_3O_4$ and progressing inwardly until all the FeO is converted to $Fe_3O_4$.

The steam used in the practice of the present invention is substantially free of oxidizing gases, such as oxygen $CO_2$, $NO_2$, etc. The steam is preferably pure.

Carbon-containing gases, preferably hydrocarbon gases, which are suitable for use herein, are those gases which are volatile at the reaction temperatures herein and which will dissociate to produce carbon at temperatures less than about 800° C. and at pressures from about 0.5 mm to about 760 mm Hg. Non-limiting examples of gases suitable for use herein include carbon monoxide, acetylenes, olefins, and paraffins. Preferred are those gases that will produce minimum amounts of amorphous carbon while contributing to maximum growth of filamentous carbon. More preferred are paraffins and most preferred are $C_2$ to $C_4$ paraffins.

By acetylenes we mean acetylene itself as well as substituted acetylene. It will be understood that the carbon-containing gas suitable for use herein can also be a gas, that, at temperatures less than about 800° C., will first produce secondary products such as $C_2$ or higher olefins which will subsequently dissociate at those temperatures to give carbon. Furthermore, diluted hydrocarbon streams can be employed if so desired. For example, the hydrocarbon stream can be diluted with an inert gas such as nitrogen or carbon-containing gases such as carbon monoxide and carbon dioxide.

When producing carbon filaments, the flow rate of the carbon-containing gas should be optimized for each gas employed and can also be determined by those having ordinary skill in the art by routine experimentation. Examples of suitable flow rates which can be employed can be found in the examples herein as well as in U.K. Pat. No. 1,469,930, incorporated herein by reference. This U.K. Patent teaches a flow rate of 10 ml/min to 40 ml/min for acetylene and diolefins when the carbon filament catalyst is a metal particle such as iron.

The carbon filaments produced in accordance with the present invention can be employed as strengthening or reinforcing agents, selective adsorption agents, or as catalyst support materials such as for hydrogenation catalysts. Furthermore, the carbon filaments as produced herein will generally have a length of about 1 to 10 microns although lengths of up to 100 microns are possible. Lengths in excess of 100 microns are usually not obtained because they tend to become detached from the catalyst surface.

The following examples serve to more fully describe the present invention. It is understood that these examples in no way serve to limit the true scope of this invention, but rather, are presented for illustrative purposes.

COMPARATIVE EXAMPLE A

Iron foil coupons (99.99%) of 0.013 cm thickness were cleaned, weighed, and placed in a one inch diameter fused silica reactor tube at room temperature and heated to a temperature of 500° C. in flowing (500 cc/min) nitrogen in a clam shell type electric furnace. Distilled water was then injected in the reactor tube at 0.5 cc/min. and the nitrogen flow rate reduced to 50 cc/min. The nitrogen used during water injection was to prevent undesirable accumulation of water at the exit of the tube. These conditions were maintained for three hours.

Water injection was then cut off and the nitrogen flow rate was increased to 500 cc/min. The furnace was turned off and opened to expose the reactor tube to room temperature, thereby ensuring rapid cooling of the samples.

Upon reaching room temperature, the coupons were re-weighed and the results are shown in Table I below:

TABLE I

| Coupon No. | Wt. before Treatment (gms) | Wt. After Treatment (gms) | Composition of Coupon After Treatment (mmoles) | |
|---|---|---|---|---|
| | | | Fe | O |
| 1 | 0.20591 | 0.20660 | 3.68 | 0.043 |
| 2 | 0.21939 | 0.21986 | 3.92 | 0.029 |
| 3 | 0.19169 | 0.19191 | 3.42 | 0.014 |
| 4 | 0.19595 | 0.19607 | 3.50 | 0.007 |
| | | | Average (normalized) Fe, 1.0; O, 0.006 | |

The surface composition of the coupons was obtained by the use of Auger Spectroscopy (e.g. Handbook of Auger Electron Spectroscopy, 2nd Ed., by L. E. Davis, pub. by Physical Electronics Industries, Inc., Eden Prairie, Minn., 1976). The atomic composition is readily obtained by measurement of the peak size from the spectra, as the relative sensitivities of iron and oxygen are known. Small samples of the coupon were inserted into the vacuum chamber of the spectrometer. The sample as inserted into the spectrometer is usually slightly contaminated with carbon from the atmosphere, and in the case of the lower oxides of iron, usually excess oxygen. Hence, in all cases the first significant data is obtained after 1 minute of Ar ion bombardment; during this time, about 150 Å of the surface is removed by the ions. The spectrum of coupon 4 (in the table) after 150 Å of the surface had been removed showed a composition of $FeO_{1.30}$. Further bombardment to a final total time of 25 min. (about 3800 Å) showed a continuous drop-off in oxygen content. The final composition of the layer at a depth of 3800 Å was $FeO_{0.08}$. There is thus no evidence of any formation of near-stoichiometric FeO in the course of this experiment.

EXAMPLE 1

The experimental procedure used in Comparative Example A was followed in all respects, except that the water was passed over the coupons for 3 hours at 540° C. The weight changes of the iron foils are shown in Table II below:

TABLE II

| Coupon No. | Wt. before Treatment (gms) | Wt. After Treatment (gms) | Composition of Coupon After Treatment (mmoles) | |
|---|---|---|---|---|
| | | | Fe | O |
| 1 | 0.19514 | 0.19607 | 3.49 | 0.058 |
| 2 | 0.21172 | 0.21223 | 3.79 | 0.032 |
| 3 | 0.19666 | 0.19721 | 3.52 | 0.034 |
| 4 | 0.18729 | 0.18755 | 3.35 | 0.016 |
| | | | Average (normalized) Fe, 1.0; O, 0.010 | |

The surface composition of Coupon No. 2 was analyzed by Auger Spectroscopy and showed a composition of $FeO_{1.00}$ after bombardment for 1 minute (150 Å) and a composition of $FeO_{0.94}$ after bombardment for 30 minutes (4500 Å). Thus, FeO has been produced to a depth of at least 4500 Å.

EXAMPLE 2

The experimental procedure used in the above examples was followed except that the water was passed over the coupons for 3 hours at 700° C. The weight changes of the iron foils are shown in Table III below:

TABLE III

| Coupon No. | Wt. before Treatment (gms) | Wt. After Treatment (gms) | Composition of Coupon After Treatment (mmoles) | |
|---|---|---|---|---|
| | | | Fe | O |
| 1 | 0.20137 | 0.21077 | 3.61 | 0.059 |
| 2 | 0.20126 | 0.21114 | 3.60 | 0.062 |
| 3 | 0.19522 | 0.20479 | 3.50 | 0.060 |
| 4 | 0.19962 | 0.20947 | 3.57 | 0.062 |
| | | | Average (normalized) Fe, 1.0; O, 0.170 | |

The surface composition of Coupon No. 4 was analyzed by Auger Spectroscopy and showed a composition of $FeO_{1.14}$ after bombardment for 1 minute (138 Å), a composition of $FeO_{0.98}$ after bombardment for 5 minutes (690 Å), and a composition of $FeO_{0.906}$ after bombardment for 20 minutes (2800 Å).

EXAMPLE 3

The experimental procedure used in the above examples was followed, except that water was initially introduced at 500° C. whereupon the coupons were heated to 800° C. and held at that temperature for 3 hours in the presence of water. The weight changes of the iron foils are shown in Table IV below:

TABLE IV

| Coupon No. | Wt. before Treatment (gms) | Wt. After Treatment (gms) | Composition of Coupon After Treatment (mmoles) | |
|---|---|---|---|---|
| | | | Fe | O |
| 1 | 0.20302 | 0.25095 | 3.64 | 3.00 |
| 2 | 0.20987 | 0.26435 | 3.76 | 3.41 |
| 3 | 0.20582 | 0.24935 | 3.69 | 2.72 |

TABLE IV-continued

| Coupon No. | Wt. before Treatment (gms) | Wt. After Treatment (gms) | Composition of Coupon After Treatment (mmoles) | |
|---|---|---|---|---|
| | | | Fe | O |
| 4 | 0.20448 | 0.25409 | 3.66 | 3.10 |
| | | | Average (normalized) Fe, 1.0; O, .83 | |

The surface composition of Coupon No. 4 was analyzed as in the previous examples and showed a composition of $FeO_{0.92}$ after bombardment for 1 minute (156 Å) and a composition of $FeO_{0.92}$ after bombardment for 40 minutes (6200 Å). This example shows that the iron foil coupons were almost totally converted to FeO when treated for 3 hours at 800° C. in the presence of water.

EXAMPLE 4

The experimental procedure used in the above examples was followed except that instead of liquid water being injected into the reactor tube, water vapor was injected by bubbling nitrogen at about 50 cc/min., through a reservoir of water. These conditions were maintained at 900° C. for a period of three hours. The weight changes of the iron foil coupons are shown in Table V below:

TABLE V

| Coupon No. | Wt. before Treatment (gms) | Wt. After Treatment (gms) | Composition of Coupon After Treatment (mmoles) | |
|---|---|---|---|---|
| | | | Fe | O |
| 1 | 0.19913 | 0.22340 | 3.57 | 1.52 |
| 2 | 0.20872 | 0.22251 | 3.74 | 0.86 |
| 3 | 0.19981 | 0.20844 | 3.58 | 0.54 |
| 4 | 0.18513 | 0.19394 | 3.31 | 0.55 |
| | | | Average (normalized) Fe, 1.0; O, .244 | |

The surface composition of Coupon No. 1 was analyzed by Auger Spectroscopy and showed a composition of $FeO_{1.21}$ after bombardment for 3.5 minutes (455 Å) a composition of $FeO_{1.06}$ After bombardment for 20 minutes (2600 Å), and a composition of $FeO_{0.83}$ after bombardment for 44.5 minutes (5800 Å).

In all the above examples, the coupons were cleaned prior to treatment. The cleaning procedure was accomplished by first immersing them in 190 proof ethyl alcohol, followed by treatment in toluene, followed by treatment in ethyl alcohol again, then boiling distilled water, then ethyl alcohol again, and finally dried in air.

In the following examples, the procedure of Comparative Example A, was followed except: both iron foil (99.99% pure) coupons of various thicknesses and mild steel foil coupons were used. The heat-up to the reaction temperature was in nitrogen at a flow of 231 cc/min. The rate of injection of $H_2O$ and $N_2$ during the run was also varied, and will be given in each example.

COMPARATIVE EXAMPLE B

Five weighed coupons (see Table VI) were heated to 800° C. in $N_2$. Distilled water was injected into the reactor at a rate of 0.5 cc/min., and the nitrogen flow rate reduced to 50 cc/min. These conditions were maintained for one hour. Water injection was then stopped and the nitrogen flow rate increased to 231 cc/min., the furnace was turned off and opened. The latter ensured rapid cooling of coupons.

The coupons were re-weighed and the results are shown in Table VI below. The oxygen uptake is shown as x in the nominal composition $FeO_x$.

Position 1 was at the inlet end of the furnace and Position 5 was toward the outlet end of the furnace. Before injecting the distilled water, it was deaerated by purging it with nitrogen.

TABLE VI

| Position No. | Composition | Thickness in μ | Initial Weight gms | Final Weight gms | x in $FeO_x$ |
|---|---|---|---|---|---|
| 1 | Fe | 50.8 | .1518 | .1924 | 0.933 |
| 2 | Fe | 127 | .1600 | .1923 | 0.268 |
| 3 | Fe | 127 | .1566 | .1701 | 0.301 |
| 4 | Fe | 100 | .1321 | .1507 | 0.491 |
| 5 | Fe | 50.8 | .1578 | .2061 | 1.068 |

EXAMPLE 5

The procedure of Comparative Example B above was followed except the time of water injection at 800° C. was two hours. The results are set forth in Table VII below:

TABLE VII

| Position No. | Composition | Thickness in μ | Initial Weight gms | Final Weight gms | x in $FeO_x$ |
|---|---|---|---|---|---|
| 1 | Fe | 50.8 | .1107 | .1484 | 1.189 |
| 2 | Fe | 127 | .1871 | .2277 | 0.757 |
| 3 | Fe | 127 | .1864 | .2287 | 0.796 |
| 4 | Fe | 100 | .0821 | .1018 | 0.838 |
| 5 | Fe | 50.8 | .1116 | .1503 | 1.210 |
| 6 | Steel | 330.2 | .7407 | .8021 | 0.289 |

EXAMPLE 6

The procedure of Comparative Example B above was followed except the time of water injection at 800° C. was three hours. The results are set forth in Table VIII below:

TABLE VIII

| Position No. | Composition | Thickness in μ | Initial Weight gms | Final Weight gms | x in $FeO_x$ |
|---|---|---|---|---|---|
| 1 | Fe | 50.8 | .1463 | .1977 | 1.225 |
| 2 | Fe | 50.8 | .1376 | .1848 | 1.196 |
| 3 | Fe | 127 | .3315 | .4280 | 1.015 |
| 4 | Fe | 100 | .2746 | .3528 | 0.993 |
| 5 | Fe | 50.8 | .1447 | .1965 | 1.248 |

EXAMPLE 7

The procedure of Comparative Example B above was followed except for time and flow rate of water injection at 800° C. The time was 17 hours, and the water flow rate 0.332 cc/min, with a nitrogen flow of 26 cc/min. The results are set forth in Table IX below.

TABLE IX

| Position No. | Composition | Thickness in μ | Initial Weight gms | Final Weight gms | x in $FeO_x$ |
|---|---|---|---|---|---|
| 1 | Fe | 50.8 | .1088 | .1504 | 1.335 |
| 2 | Fe | 127 | .1873 | .2552 | 1.265 |
| 3 | Fe | 127 | .1850 | .2552 | 1.268 |
| 4 | Fe | 100 | .0794 | .1095 | 1.323 |
| 5 | Fe | 50.8 | .1135 | .1569 | 1.335 |
| 6 | Steel | 330.2 | .7227 | .9633 | 1.162 |

Sample 3 X Ray Diffration Data: Unground-Pure $Fe_3O_4$ (No $Fe_2O_3$ or Fe) Ground-Both FeO & $Fe_3O_4$ (No $Fe_2O_3$ or Fe)

Sample 5 X Ray Diffraction Data: Ground-Pure $Fe_3O_4$ only

Sample 6 X Ray Diffraction Data: Unground-Pure $Fe_3O_4$ Ground-Both FeO & $Fe_3O_4$, (No $Fe_2O_3$).

EXAMPLE 8

The procedure of Comparative Example B above was followed except the reactor was made of an iron-nickel alloy known as Inconel, of internal diameter 1.04 inches. The time of injection of water at 800° C. was four hours. The results are set forth in Table X below.

TABLE X

| Position No. | Composition | Thickness in μ | Initial Weight gms | Final Weight gms | x in $FeO_x$ |
|---|---|---|---|---|---|
| 1 | Fe—Ni | 1270 | 19.6414 | 20.5020 | 0.153 |
| 3 | Fe—Ni | 1270 | 20.5751 | 21.4943 | 0.156 |
| 5 | Fe—Ni | 1270 | 20.1691 | 20.8484 | 0.118 |

EXAMPLE 9

The procedure and reactor of Example 8 above were used exactly, except that the time of water injection was seven hours, and the water was purposely saturated with air for about one hour before beginning the run.

TABLE XI

| Position No. | Composition | Thickness in μ | Initial Weight gms | Final Weight gms | x in $FeO_x$ |
|---|---|---|---|---|---|
| 1 | Steel | 1270 | 20.4661 | 21.8202 | 0.231 |
| 2 | Fe—Cr | — | — | — | — |
| 3 | Steel | 1270 | 20.2885 | 21.6424 | 0.233 |
| 4 | Fe—Cr | — | — | — | — |
| 5 | Steel | 1270 | 20.4036 | 21.4100 | 0.172 |

EXAMPLE 10

The procedure of Example 7 above was followed except the time of injection of the water was one hour, the water was deaerated with nitrogen, and a silica reactor was used. The results are set forth in Table XII below.

TABLE XII

| Position No. | Composition | Thickness in μ | Initial Weight gms | Final Weight gms | x in FeO | FeO Growth Rate in μ/hr. |
|---|---|---|---|---|---|---|
| 1 | Fe | 50.8 | .1082 | .1317 | .758 | 19.25 |
| 2 | Fe | 127 | .1441 | .1568 | .308 | 19.56 |
| 3 | Fe | 100 | .1078 | .1219 | .457 | 22.85 |
| 4 | Fe | 100 | .1112 | .1230 | .370 | 18.50 |
| 5 | Fe | 50.8 | .1134 | .1374 | .739 | 18.77 |
| 6 | Steel | 330.2 | .6436 | .6748 | .169 | 27.90 |

As the FeO grows inwards from the outer surface of the foil, the depth of penetration is readily calculated from the initial thickness and x in $FeO_x$, if the sample is a mixture of iron and FeO.

EXAMPLE 11

The procedure of Comparative Example B above was followed except that temperature of the reaction was 750° C., and the duration of water flow was three hours. The results are set forth in Table XIII below.

TABLE XIII

| Position No. | Composition | Thickness in μ | Initial Weight gms | Final Weight gms | x in FeO | FeO Growth Rate in μ/hr. |
|---|---|---|---|---|---|---|
| 1 | Fe | 50.8 | .1147 | .1403 | .779 | 6.59 |
| 2 | Fe | 250 | .3580 | .3766 | .181 | 7.54 |
| 3 | Fe | 100 | .1380 | .1525 | .367 | 6.12 |
| 4 | Fe | 100 | .1501 | — | .395 | 6.58 |
| 5 | Fe | 50.8 | — | — | — | — |
| 6 | Steel | 330.2 | .6636 | .6950 | .164 | 9.02 |

EXAMPLE 12

The procedure of Example 10 above was followed, except the temperature was 700° C., and the duration was 17 hours. The results are set forth in Table XIV below.

TABLE XIV

| Position No. | Composition | Thickness in μ | Initial Weight gms | Final Weight gms | x in FeO | FeO Growth Rate in μ/hr. |
|---|---|---|---|---|---|---|
| 1 | Fe | 50.8 | .1039 | .1397 | 1.203 | — |
| 2 | Fe | 250 | .3358 | .3676 | 0.331 | 2.43 |
| 3 | Fe | 100 | .1522 | .1843 | 0.736 | 2.16 |
| 4 | Fe | 100 | .1609 | .1959 | 0.759 | 2.23 |
| 5 | Fe | 50.8 | .1022 | .1382 | 1.230 | — |
| 6 | Steel | 330.2 | .6373 | .6887 | 0.282 | 2.74 |

EXAMPLE 13

The procedure of Example 10 above was followed except the temperature of water injection was 650° C., and the duration was 17 hours. The results are set forth in Table XV below.

TABLE XV

| Position No. | Composition | Thickness in μ | Initial Weight gms | Final Weight gms | x in FeO | FeO Growth Rate in μ/hr. |
|---|---|---|---|---|---|---|
| 1 | Fe | 50.8 | .1046 | .1280 | .781 | 1.17 |
| 2 | Fe | 250 | .3692 | .3855 | .154 | 1.13 |
| 3 | Fe | 100 | .1599 | .1796 | .430 | 1.25 |
| 4 | Fe | 100 | .1684 | .1872 | .390 | 1.15 |
| 5 | Fe | 50.8 | .0983 | .1234 | .891 | 1.33 |
| 6 | Steel | 330.2 | .8235 | .8573 | .143 | 1.39 |

COMPARATIVE EXAMPLE C

Various samples of $Fe_2O_3$ and Fe were used to catalyze the formation of filamentous carbon in an ethane environment. The $Fe_2O_3$ samples of known area were in the form or irregularly shaped wafers which were pressed from a powder having a purity of greater than 99.8% $Fe_2O_3$. The Fe samples were cut from a foil having a purity of 99.99% Fe. The size of each Fe sample was about 3 cm×9.6 cm and had a thickness of 0.0133 cm. The Fe samples were cleaned before treatment by first immersing them in 190 proof ethyl alcohol, followed by treatment in toluene, followed by treatment in ethyl alcohol again, then boiling distilled water, then ethyl alcohol again and finally dried in air.

All samples were subjected to the same conditions in ethane. Specifically, they were first placed in a fused silica tube in a three zone furnace at room temperature, and heated to a temperature of 700° C., in flowing nitrogen or argon, whereupon the gas mixture was changed to 1% oxygen in nitrogen which was passed through water at 0° C., then passed over the samples for five minutes. The tube containing the samples was then flushed with nitrogen for five minutes, whereupon ethane was introduced at a rate of 94 cc/min for a time period from one to six hours, depending on the sample. During this ethane treatment no nitrogen or argon was present.

The weight of deposited carbon was determined by comparing the weight of the sample before and after ethane treatment. It is well known in the art that Fe and $Fe_2O_3$ will form filamentous carbon under the conditions employed herein.

Tables XVI and XVII below more specifically set forth the conditions employed during ethane treatment for each sample, as well as showing the amount of carbon formed per $cm^2$ of sample.

TABLE XVI

CARBON FORMATION FROM ETHANE ON Fe

| Sample No. | Gas | Reaction Time (hr) | Carbon Formed | |
|---|---|---|---|---|
| | | | $10^{-4}$ h/$cm^2$ | $10^{-4}$ g/$cm^2$/hr |
| 1 | $N_2$ | 2 | 303.8 | 151.9 |
| 2 | Ar | 2.5 | 308.4 | 139 |
| 3 | Ar | 2 | 119 | 59.5 |
| 4 | Ar | 2 | 232.2 | 116.1 |
| 5 | Ar | 2 | 152.8 | 76.4 |
| 6 | Ar | 3 | 424.6 | 141.5 |
| 7 | Ar | 3 | 326.4 | 109 |
| 8 | Ar | 1 | 113.2 | 113.2 |
| 9 | $N_2$ | 1 | 148.4 | 148.4 |
| 10 | Ar | 1 | 109.9 | 109.9 |
| 11 | Ar | 1 | 113.3 | 113.3 |
| 12 | Ar | 1 | 148.5 | 148.5 |
| 13 | Ar | 1 | 77.6 | 77.6 |
| 14 | Ar | 1 | 91.8 | 91.8 |
| | | | | Average = 114 |

TABLE XVII

CARBON FORMATION FROM ETHANE ON $Fe_2O_3$

| Sample No. | Gas | Reaction Time (hr) | Carbon Formed | |
|---|---|---|---|---|
| | | | $10^{-4}$ h/$cm^2$ | $10^{-4}$ g/$cm^2$/hr |
| 15 | $N_2$ | 2 | 450 | 225 |
| 16 | $N_2$ | 2 | 535 | 267.5 |
| 17 | $N_2$ | 2 | 348 | 174 |
| 18 | $N_2$ | 2 | 882 | 441 |
| 19* | $N_2$ | 2 | 526 | 263 |
| 20* | $N_2$ | 2 | 666 | 333 |
| 21* | $N_2$ | 2 | 445 | 222.5 |
| 22* | $N_2$ | 2 | 483 | 241.5 |
| | | | | Average = 271 |

*These samples did not undergo a 1% oxygen in nitrogen treatment before being treated with ethane.

EXAMPLE 14

Five samples of Fe foil, identical to the foil used in the above comparative example, were oxidized at 800° C. in water to form FeO. Mossabauer Spectroscopy, Auger Spectroscopy, and X-ray diffraction techniques were used to verify that FeO was produced. These FeO samples were then subjected to the same procedure, as described in the above comparative example, for treatment with ethane, except for the variations noted in Table XVIII below:

TABLE XVIII

CARBON FORMATION FROM ETHANE ON FeO

| Sample No. | Gas | Reaction Time (hr) | Carbon Formed | |
|---|---|---|---|---|
| | | | $10^{-4}$ h/$cm^2$ | $10^{-4}$ g/$cm^2$/hr |
| 1 | Ar | 1 | 1086 | 1086 |
| 2 | Ar | 1 | 1869 | 1869 |
| 3 | Ar | 1 | 1129 | 1129 |

TABLE XVIII-continued

CARBON FORMATION FROM ETHANE ON FeO

| Sample No. | Gas | Reaction Time (hr) | Carbon Formed | |
|---|---|---|---|---|
| | | | $10^{-4}$ h/$cm^2$ | $10^{-4}$ g/$cm^2$/hr |
| 4 | $N_2$ | 6 | 8214 | 1369 |
| 5 | $N_2$ | 1 | 1461.6 | 1461.6 |
| | | | | Average = 1383 |

Small portions of the carbon produced from these FeO substrates were subsequently oxidized in controlled atmosphere electron microscopy experiments and the carbon was found to be substantially filamentous. A description of controlled atmosphere electron microscopy can be found in Baker, R. T. K., "Carbon Formation on Supported Metal Catalysts," p. 18, in *Gas Chemistry in Nuclear Reactors and Large Industrial Plant*, edited by A. Dyer, Hedon and Son, Ltd., London 1980.

This example, when compred with the above comparative example, illustrates the superior qualities of FeO for catalyzing the formation of filamentous carbon. Furthermore, the reactivity of FeO with respect to filamentous carbon formation is so high that examination of all the FeO samples of this example revealed no trace of the original Fe foil. That is, the entire foil substrate had been completely disintegrated into small particles which were intimately mixed with carbon. Although it had been known that Fe and $Fe_2O_3$ were capable of catalyzing filamentous carbon formation, it had heretofore not been known that such carbon could be formed by way of FeO—let alone at such high rates of formation.

COMPARATIVE EXAMPLE D

A sample of Fe foil identical to that used in the above examples was cleaned as previously described and placed in a scanning electron microscope and heated from room temperature (about 20° C.) to 750° C. in the presence of 0.3 Torr flowing acetylene. The sample was held at 750° C. in acetylene until the activity of the Fe for catalyzing the formation of filamentous carbon dropped dramatically. This was determined by continuously analyzing the gaseous effluent from the scanning electron microscope by use of a mass spectrometer. That is, during the formation of filamentous carbon, the acetylene is decomposed and a lower level comes off as effluent, whereas, when the formation of this carbon ceases, the acetylene coming off returns to its original level before reaction began.

Analysis of the effluent revealed that carbon formation commenced at about 650 C. and continued for about 10 minutes from the time 750° C. had been reached. The surface of the substrate was observed before and during treatment.

A section of the treated sample was observed by use of a transmission electron microscope and was found that the carbon formed had been entirely filamentous.

EXAMPLE 15

A portion of an FeO sample prepared according to the procedure of Example 1 above was placed in a scanning electron miscoscope under conditions and procedures identical to those described in Comparative Example D above. The effluent acetylene level after 120 minutes of reaction did not increase nor did it show signs of increasing to its original level after two hours of reaction. This indicated that even after two hours in acetylene the FeO sample was still catalyzing the formation of filamentous carbon as opposed to a maximum of 10 minutes for Fe. In fact, the reaction was not brought to completion but was terminated at the end of two hours as a matter of convenience.

The surface of the treated substrate was observed and was compared to the surface of the sample of Comparative Example C. It was observed that the density of filamentous carbon on the FeO substrate was at least an order of magnitude greater than that of the Fe substrate of Comparative Example D.

The surface of the treated FeO substrate was also observed under a transmission electron microscope wherein it was found that substantially all of the carbon was filamentous.

COMPARATIVE EXAMPLE E

A protion of an $Fe_2O_3$ wafer, as prepared according to Comparative Example A above, was placed in a scanning electron microscope under conditions and procedures identical to those previously described. The behavior of this $Fe_2O_3$ substrate with respect to filamentous carbon formation was nearly identical to the Fe substrate of Comparative Example C. That is, after about 10 minutes of reaction, the level of effluent acetylene was virtually at its original level. Furthermore, as the powder used in the preparation of the $Fe_2O_3$ wafer had a high surface area, the reactivity of $Fe_2O_3$ per unit area would be much lower than that of Fe foil. The carbon formed by this $Fe_2O_3$ substrate was also found to be filamentous.

EXAMPLE 16

A portion of the Fe foil and a portion of an FeO substrate as previously described were run side by side in a scanning electron miscoscope under the identical conditions and procedures as set forth in the previous few examples. The reaction was run for 10 minutes after the substrates reached a temperature of 750° C. The treated substrates were then examined by transmission electron miscoscopy wherein it was again found that the density of filamentous carbon formed in the FeO substrate was at least an order of magnitude greater than that formed on the Fe substrate.

What is claimed is:

1. A method for producing carbon filaments, which method comprises:
    (a) heating a metallic iron composition, comprised of at least about 95 wt. % iron, to a temperature of at least about 540° C., which iron composition is in a form selected from tube, sheet, rod, foil, and gauze;
    (b) contacting the heated iron composition with steam for an amount of time which will convert all, or a portion of, the iron composition to FeO, but no greater than the time at which FeO begins to convert to $Fe_3O_4$; and
    (c) contacting the resulting iron monoxide with one or more carbon-containing gases at a temperature from the dissociation temperature of the gas to about 800° C., wherein the iron composition is substantially free of: (aa) elements which form protective oxides at the temperature employed in step (a) above; and (bb) metal components which are volatile at the temperature employed in step (a) above.

2. The method of claim 1 wherein the carbon-containing gas is selected from the group consisting of carbon monoxide, acetylenes, olefins and paraffins.

3. The method of claim 1 wherein the carbon-containing gas is selected from the group consisting of the $C_2$ to $C_4$ paraffins.

4. The method of claim 1 wherein the temperature employed in step (a) is from about 700° C. to about 800° C.

* * * * *